United States Patent [19]

Gérard

[11] Patent Number: 4,663,972
[45] Date of Patent: May 12, 1987

[54] ACCELEROMETER SENSOR WITH FLAT PENDULAR STRUCTURE

[75] Inventor: Marcillat Gérard, Chatellerault, France

[73] Assignee: Societe Francaise d'Equipements pour la Navigation Aerienne (S.F.E.N.A.), France

[21] Appl. No.: 708,923

[22] Filed: Mar. 6, 1985

[30] Foreign Application Priority Data

Mar. 6, 1984 [FR] France .................................. 84 03441

[51] Int. Cl.[4] ...................... G01P 15/08; G01P 15/125
[52] U.S. Cl. ................................. 73/517 R; 73/517 B
[58] Field of Search ................. 73/517 R, 517 B, 514, 73/652, , 654; 310/329; 338/46; 361/280

[56] References Cited

U.S. PATENT DOCUMENTS

| 2,883,176 | 4/1959 | Bernstein | 73/654 |
| 3,339,419 | 9/1967 | Wilcox | 73/517 B |
| 3,636,774 | 1/1972 | Allison | 73/517 R X |
| 4,145,929 | 3/1979 | Aske | 73/517 B |
| 4,483,194 | 11/1984 | Rudolf | 73/517 R |

FOREIGN PATENT DOCUMENTS

| 2096326 | 10/1982 | United Kingdom | 73/517 R |
| 714285 | 3/1977 | U.S.S.R. | 73/517 R |

OTHER PUBLICATIONS

Foldvar et al., Capacitive Transducers, Instruments and Control Systems, Nov. 1964, vol. 37, pp. 77-85.

Primary Examiner—Stewart J. Levy
Assistant Examiner—Scott M. Oldham
Attorney, Agent, or Firm—William A. Drucker

[57] ABSTRACT

An accelerometer sensor comprising a flat pendular structure having a fixed part and a flat test body suspended from the fixed part by two parallel blades flexible in the plane of said test body, so as to be able to move in translation along a sensitive axis. Said test body extends at least partially into the space between said two flexible blades.

18 Claims, 10 Drawing Figures

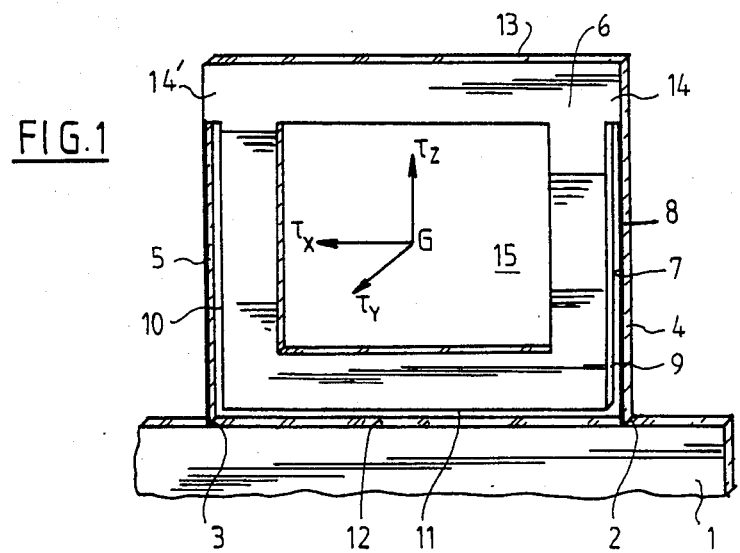

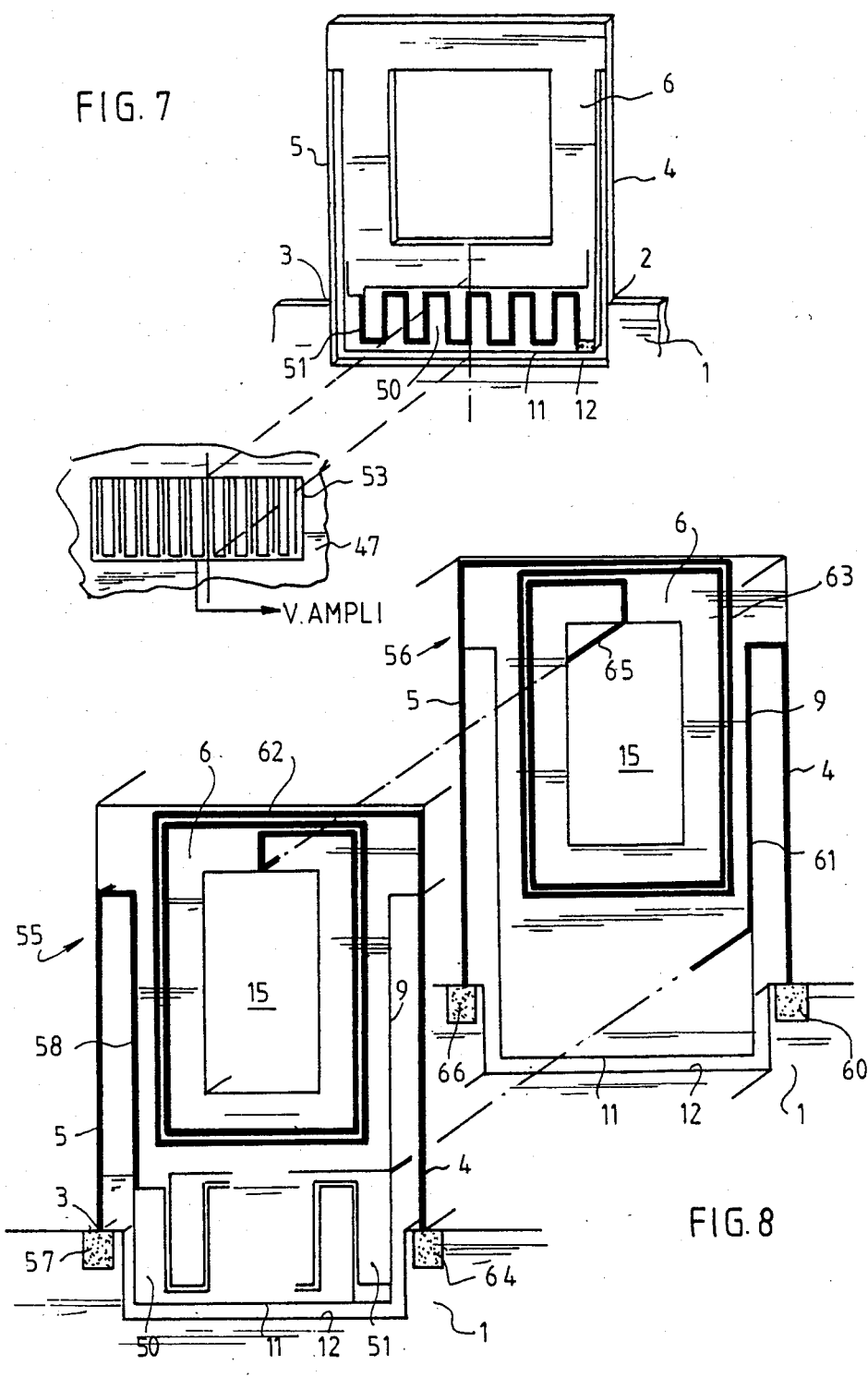

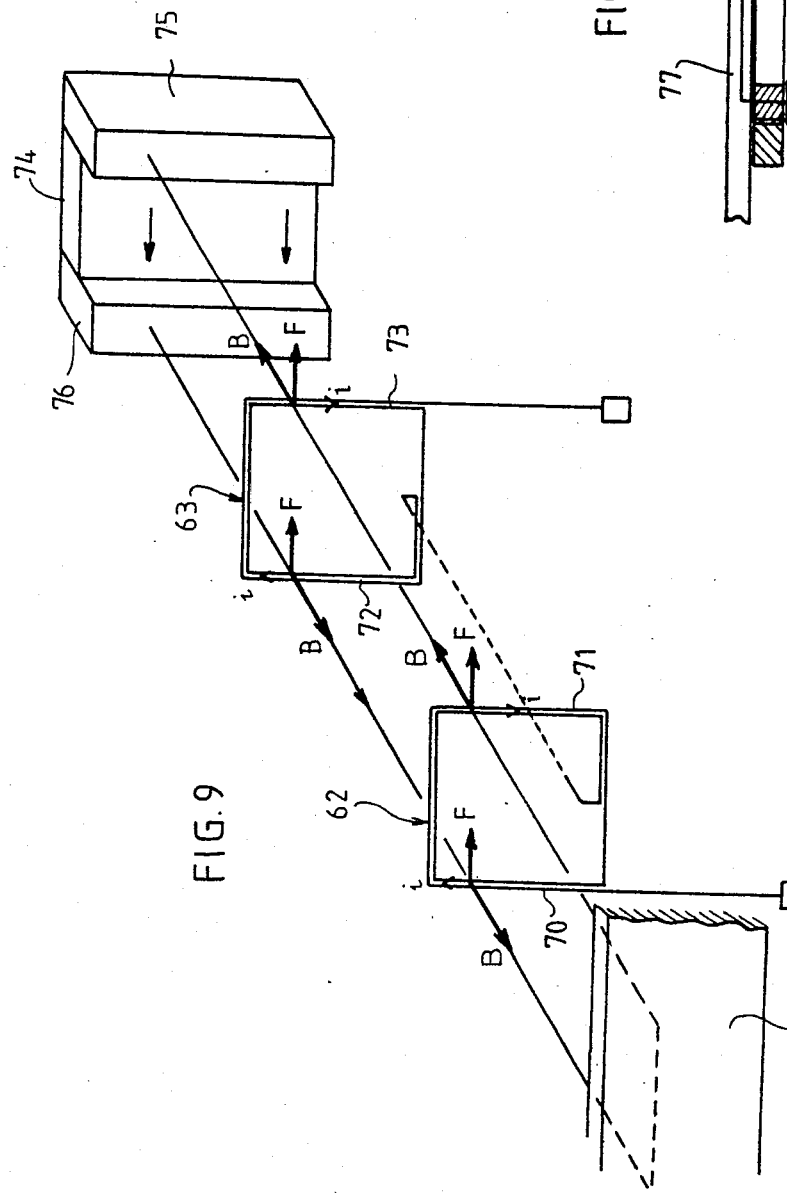
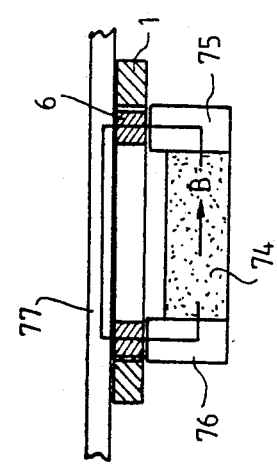
FIG. 9
FIG. 10

ACCELEROMETER SENSOR WITH FLAT PENDULAR STRUCTURE

BACKGROUND OF THE INVENTION

1. Field of the Invention

The present invention relates to an accelerometer sensor using a flat pendular structure in which the sensitive axis is situated in the plane of the structure.

It relates more particularly to an accelerometer sensor in which the pendular structure may be formed by micro-machining a crystalline wafer made for example from silicon or quartz and comprises a flat test body suspended by two flexible parallel blades in the plane of said test body.

2. Description of the Prior Art

So as to overcome the effects produced by the transverse components of the forces exerted on the test body and so as to increase the sensitivity of the sensor in its measuring axis, the flexible blades must be designed so as to have as little stiffness as possible in the plane of the structure and as high a stiffness as possible perpendicularly to this plane.

However, because of the mechanical properties of the material used and because of the manufacturing techniques employed, it has proved impossible to totally remove the influence of these transverse components, mainly in the case where it is desired to form highly sensitive sensors.

A first aim of the invention is therefore to provide a pendular structure of the type mentioned above, which, because of its geometrical forms, reduces the transverse stresses exerted on the flexible blades by the test body when this latter is subjected to transverse forces (transverse accelerations).

SUMMARY OF THE INVENTION

To arrive at this result, the invention provides a pendular structure in which the test body extends at least partially into the space between the two plates so as to bring the center of gravity of the test body as close as possible to the anchorage points (or feet) of the flexible blades on the fixed part of the structure.

Furthermore, in an accelerometer sensor using a structure such as described above, determination of the aclerations necessarily involves the detection of the movements of the test body.

The invention therefore also provides capacitive detectors for measuring the translational movements of the test body, specifically designed for the above described pendular structure.

In a first embodiment of the invention, these capacitive movement detectors comprise at least a first capacitor plate supported by at least one zone of the edge of the test body substantially perpendicular to the sensitive axis of the sensor and a second capacitor plate carried by at least one zone of the edge of the fixed part of the pendular element, parallel to said first plate and spaced a small distance therefrom. These two capacitor plates may be advantageously obtained by metallizing said zones of the edge of the test body and of the fixed part of the pendular structure.

In a second embodiment of the invention, said capacitive detectors comprise at least one capacitor plate consisting of at least one strip of an electrically conducting material, carried by a face of said test body and at least a second strip of an electrically conducting material extending parallel to the first strip and at a small distance therefrom, said second strip being carried by a frame firmly secured to the fixed part of the pendular structure.

In the above described embodiments, the electrical connections between the capacitor plates supported by the test body and the electronic circuit supported by the fixed part of the pendular structure are advantageously formed by metallizing the thin faces of the flexible blades (parallel to the plane of the structure).

In addition to the means for detecting the translational movements of the test body, the sensor may further comprise a return motor counterbalancing the external action exerted on the test body. Thus, according to another characteristic of the invention, this motor uses, in a conventional way, the Laplace force obtained by the action of a magnetic induction on a current flowing in a coil printed at the periphery of at least one of the two faces of said test body.

Said coil may be formed by known methods such as metal deposits, chemical etching of a uniform deposit, etc. . . . in this case, the connections with the outside are provided through conducting areas, possibly formed by metallization, supported by the thin faces of the flexible blades, which are not used for the electrical connection of the capacitor plates. To avoid overlapping of the electrical connections between, on the one hand, the capacitor plates and the coil and, on the other, the conducting areas supported by the flexible blades, the test body may comprise at least one metallized passage between its two faces so that said electrical connections may be arranged on one and/or the other face of said test body.

The magnetic circuit for producing the magnetic induction on the coil is then formed by a permanent magnet, magnetized crosswise and having two pole pieces which extend parallel to one face of the test body and at a small distance therefrom. This magnetic circuit is relooped by an armature which extends parallel to the other face of the body.

More precisely, said coils comprise two opposite rectilinear zones, perpendicular to the sensitive axis of the sensor and through which a current flows in the opposite direction. In this case, said pole pieces are adapted so as to cover respectively said two rectilinear zones, so that the forces generated at the level of these two rectilinear zones on the test body by the current flowing in the coil are exerted in the direction of the sensitive axis and in the same direction.

BRIEF DESCRIPTION OF THE DRAWINGS

Some embodiments of the invention will be described hereafter by way of non limitative examples with reference to the accompanying drawings in which:

FIG. 1 is a perspective view of a pendular structure in accordance with the invention, FIGS. 2, 3, 4 and 5 show, seen from the front, four variants of a pendular structure equipped with frontal movement capacitive detectors, FIGS. 6 and 7 show in schematical perspective two pendular structures equipped with a lateral movement capacitive detector, FIG. 8 is a schematical representation showing the two opposite faces of a pendular structure of the type shown in FIG. 7, equipped with a lateral movement capacitive detector and two coils mounted respectively on the two faces of the test body., FIG. 9 is a theoretical diagram of the return motor equipping the pendular structure shown in FIG. 8, and FIG. 10 is an axial section of the pendular element equipped with its return motor.

DESCRIPTION OF THE PREFERRED EMBODIMENTS

Figure 5:
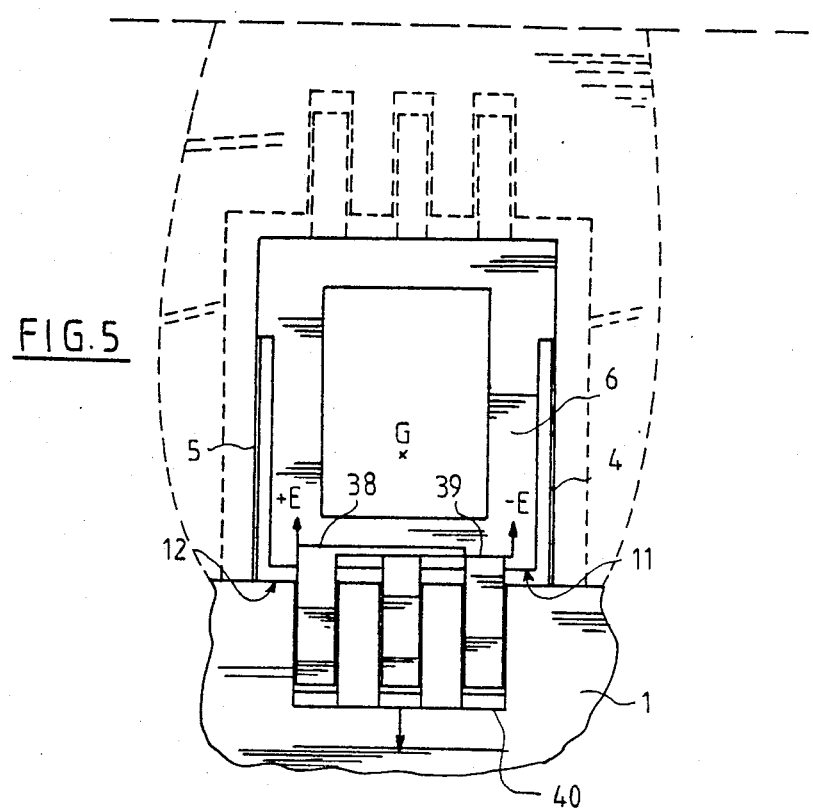

FIG. 1 shows the basic geometry of a pendular structure in accordance with the invention. As mentioned above, this structure is flat and may be formed is a single piece by micro-machining a crystalline silicon or quartz wafer which may further serve as substrate for an integrated electronic circuit.

It is formed from a fixed part or base 1 on which are anchored the lower ends or feet 2, 3 of two parallel flexible blades 4, 5 of the same length, supporting at their upper ends a test body 6 of substantially rectangular shape which extends for a large part into the volume between the two flexible blades 4, 5.

The flexible blades 4, 5 have, in the plane of the structure, as small a width as possible. Their thickness is that of the crystalline wafer. Consequently, these blades 4, 5 have very low stiffness in the plane of the structure, whereas they have relatively high stiffness perpendicularly to this plane. The sensitive axis $\tau X$ of this structure is therefore situated in the plane of the structure and is perpendicular to the flexible blades 4, 5.

In the rest of the description, the walls of the different elements situated in the thickness direction of the blade and obtained for the most part by electromachining, will be designated by the expression "edges".

Thus, for example, each of the flexible blades 4, 5 will comprise two parallel edges, namely an inner edge 7 orientated towards the test body 6 and an outer edge 8 orientated towards the outside. Similarly, the test body 6 comprises two lateral edges 9, 10 extending parallel to the inner edges of the flexible blades 4, 5, a longitudinal inner edge 11 connecting together the lateral edges 9, 10 parallel to the corresponding inner edge 12 of the fixed part 1 of the structure, and a longitudinal outer edge 13 situated slightly beyond the ends of the flexible blades 4, 5. The connection of the flexible blades 4, 5 to the test body 6 is provided by means of two lateral projections 14, 14' provided on the test body 6 for determining the spacing between the flexible blades 4, 5 and the lateral edges 9, 10 of the test body 6.

As can be seen in this Figure, the pendular structure may be obtained by forming in the crystalline wafer a U shaped recess forming the inner edges 7 of the flexible blades 4, 5 the two lateral edges 9, 10 and the longitudinal inner edge 11 of the test body 6 as well as the inner edge 12 of the fixed part 1 of the structure.

Similarly, the outer edges 8 of the flexible blades 4, 5 and the longitudinal outer edge 13 of the test body 6 may be obtained by a cut-out in the form of an inverted U.

In the example shown in FIG. 1, test body 6 further comprises a rectangular recess 15 for lightening the structure.

The geometry of this pendular structure has the advantage of bringing the centre of gravity G of the test body as close as possible to the feet 2, 3 of the flexible blades 4, 5.

Of course, the invention is not limited to the form of the pendular structure shown in FIG. 1. It may be more particularly adapted so as to allow capacitive detectors to be mounted.

Generally, these detectors necessarily comprise at least two capacitor plates mobile with respect to each other, one being fixed to the test body 6 and the other being secured to the fixed part 1 of the pendular structure, these two plates being adapted so that a movement of the test body 6 along its measuring axis $\tau X$ causes a corresponding variation of the capacity, the measurement of this capacity variation allowing the amplitude of the movement of the test body 6 and, consequently, of the component of the acceleration along the measuring axis $\tau X$ to be determined.

Figure 6:
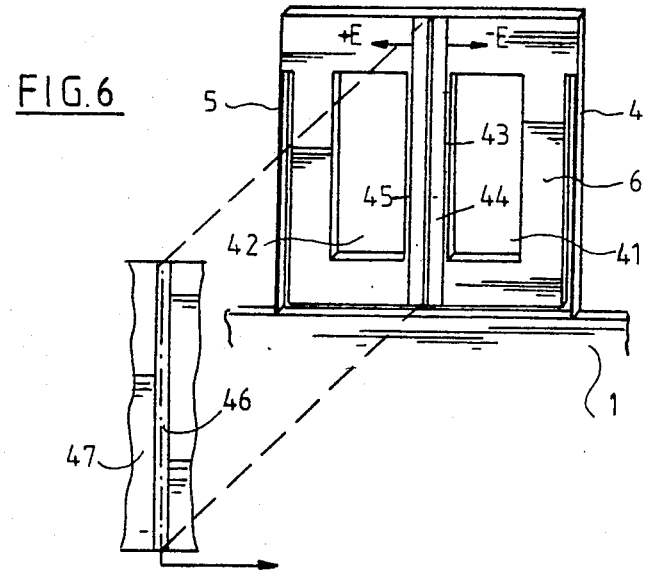

Two types of capacitive detectors may be used for equipping the pendular structure described above, namely:

frontal movement detectors such as those shown in FIGS. 2 to 5 which comprise at least two parallel plates, perpendicular to the sensitive axis $\tau X$ of the pendular structure and whose spacing and, consequently, capacity vary depending on the movements of the test body 6, and lateral movement detectors such as those shown in FIGS. 6 and 7 which comprise at least two plates parallel to the measuring axis $\tau X$; in this case, the spacing between the two plates is constant and the movement of the test body 6 causes displacement of one of the plates with respect to the other and, consequently, variation of the capacity.

In the example shown in FIG. 2, the lateral sides of the test body comprise two extensions 16, 17 extending outwardly beyond the points at which flexible blades 4, 5 are joined to the test body 6. These two lateral extensions 16, 17 each comprise a rectilinear edge 18, 19 perpendicular to the sensitive axis $\tau X$ of the structure and extending substantially in the plane of the corresponding flexible blade. These edges 18, 19 are metallized and form two capacitor plates.

Furthermore, the fixed part 1 comprises two wings 20, 21 having, parallel to the metallized edges 18, 19 and at right angles thereto, two respective metallized edges 22, 23 forming two capacitor plates associated with the plates formed by edges 18, 19.

In this case, the electrical connection between the metallized edges 18, 19 and the circuit carried by the fixed part 1 is provided by metallizing the thin faces of the flexible blades 4, 5 defined by edges 7, 8.

The capacitive detector equipping the pendular structure shown in FIG. 3 comprises two plates formed by metallizing the two lateral inner edges 9, 10 of the test body 6, these two plates cooperating with two respective plates formed by the metallization of the corresponding parallel edges 25, 26 of two wings 27, 28 of the fixed part 1 of the pendular structure which extend respectively into the space between the two flexible blades 4, 5 and the inner lateral edges 9, 10 of the test body 6.

In the example shown in FIG. 4, test body 6 comprises two lateral extensions 29, 30 extending towards the outside beyond the points where the flexible blades 4, 5 and the test body 6 are joined together, and coming back towards the points 2, 3 where said flexible blades 4, 5 are anchored to the fixed part 1 of the pendular structure.

In this case, these two lateral extensions comprise outer lateral edges 32, 33 perpendicular to the sensitive axis $\tau X$ of the pendular structure. These edges 32, 33 are metallized so as to form capacitor plates which cooperate with corresponding parallel metallized edges 34, 35 on the two outer lateral wings, 36, 37 of the fixed plate 1 of the pendular structure.

In the example shown in FIG. 5, the inner longitudinal edge 11 of test body 6 and the corresponding inner edge of the fixed part 1 of the pendular structure have crenelated shapes which comprise square projections each having a front edge portion and first and second lateral edge portions, which extend perpendicularly to said front edge portion, the square projections of each of said inner edges being separated from each other by square notches, and the square projections on one of these edges engaging in the square notches of the other inner edge.

The lateral edge portions of these two edges 11, 12 are then metallized so as to form capacitor plates, which cooperate therebetween, so as to form flat capacitors whose capacity varies depending on the movements of the test body.

FIG. 5 shows one embodiment of the connections of the plates of these capacitors. In this embodiment, the first lateral edge portions of the square projections of the lower longitudinal edge 11 of the test body 6 have metallizations which are connected to an AC voltage source +E by conductors 38, whereas the metallizations of the second lateral edge portions of this edge are connected by conductors 39 to an AC voltage source −E, in phase opposition with the voltage source +E. The difference voltage is collected on the metallizations of the lateral edge portions of the inner edge 12 of the fixed part of the pendular structure, which are connected in parallel by a conductor 40.

The advantage of the above described structure is that first of all it allows the center of gravity G of the test body to be placed exactly in the middle of the length of flexible blades 4, 5 (which, under the influence of a transverse acceleration $\tau Y$, allows the test body 6 to move in a translational movement) or even closer to the feet 2, 3 of the flexible blades 4, 5, which reduces the stresses exerted on said blades 4, 5 when the test body 6 is subjected to a transverse acceleration $\tau Y$. This solution further allows an appreciable increase in the area of the detectors and, consequently, an increase in sensitivity. It further allows the distances between the detection zones and the difference signal amplification circuit to be reduced and consequently reduces the risks of disturbance.

Of course, the longitudinal edge of the test body, opposite the inner longitudinal edge 11, and a corresponding edge of the fixed part may also have crenelated shapes with mutually interpenetrating square projections and notches. In this case, in a similar way, the lateral edge portions of these indentations may then be metallized so as to form capacitor plates. This solution, which is shown with broken lines in FIG. 5, allows an appreciable increase of the detection areas to be obtained and, consequently, an increase in sensitivity.

As mentioned above, the capacitive detectors equipping the pendular structure of the invention may be of the lateral movement type.

FIG. 6 shows one embodiment of such a detector in a pendular structure of the type shown in FIG. 1, but in which the test body 6 comprises two central recesses 41, 42 separated by a central strip 43 substantially parallel to the flexible blades 4, 5.

This central strip 43 comprises on one side two parallel conducting areas 44, 45 spaced slightly apart from each other and formable by flat metallization. These two conducting areas 44, 45 which form two capacitor plates cooperate with a conducting area 46, parallel to the plane of the test body 6 and separated therefrom by a distance for example of the order of a few hundredths of a millimeter. This conducting area 46 is supported by a frame 47 firmly secured to the fixed part 1 of the pendular structure.

At rest, the conducting area 46 is centered in the median plane of symmetry of the two conducting areas 44, 45 so that, when the test body 6 moves in its plane, the capacity of the flat capacitor formed by the conducting area 46 and one of the two conducting areas 44, 45 of the test body will increase, whereas the capacity of the flat capacitor formed by the conducting area 46 and the other conducting area 44, 45 of the test body 6 will decrease.

In this example, areas 44, and 45 are connected respectively to two AC voltage sources in phase opposition +E and −E, whereas area 46 is connected to a circuit for detecting and amplifying the difference signal.

In the example shown in FIG. 7, the inner longitudinal edge 12 of the fixed part 1 of the pendular structure is below the anchorage point 2, 3 or feet of the flexible blades 4, 5. Moreover, the test body 6 comprises, in the vicinity of this edge 12, a zone on which is formed a plurality of pairs of conducting areas of the same type as areas 44, 45 used in the pendular structure shown in FIG. 6. These pairs of conducting areas are connected in parallel and form two crenelated circuits 50, 51 whose projections are intermingled. One of these circuits 50 is connected to an AC voltage source +E, whereas the other circuit 51 is connected to an AC voltage source −E in phase opposition with source +E.

These pairs of conducting areas each cooperate with a corresponding conducting area on a frame 47 in a way similar to that described in connection with FIG. 6. These conducting areas, which are in the form of a comb 53, are connected to a difference signal detection and amplification circuit.

With such an arrangement, the gain of the sensor may be increased and/or the height of the pendular structure decreased for a given gain (better use of the area of the substrate).

Furthermore, with such an arrangement the two faces of the test body may be equipped with two respective coils for servo-controlling the sensor, as will be described hereafter. Of course, as in the case of the embodiment shown in FIGS. 5 and 6, it allows the center of gravity G of the test body to be positioned as required.

FIG. 8 illustrates one embodiment of the connections of a sensor of the type shown in FIG. 7, whose test body is equipped with two coils (one per face 55, 56).

In this example, the indented circuit 50 of the capacitive detector is connected to a connection area 57 situated on the fixed part 1 of the pendular structure by means of an electrical connection provided on the front face of the pendular structure and comprising a conducting strip 58 extending flat along the side edge portion of the test body 6 or even if required along the edge 10 thereof, this conducting strip being connected to a metallized one of the thin faces of the flexible blade 5, itself connected, at the level of foot 3, to the connection area 57. Similarly, the indented circuit 51 of the capacitive detector is connected to a connection area 60 provided on the rear face 56 of the fixed part of the pendular structure by means of an electric connection comprising a conducting strip 61 extending along the lateral edge portion of the rear face 56 of the test body 6 or even along the edge 9 thereof, this conducting strip being connected to a metallized one of the thins faces of the flexible blade 4, itself connected, at the level of foot 2 to the connection area 60.

Furthermore, the two faces of test body 6 each comprise a return motor coil 62, 63 formed for example by a flat metallization which extend to the periphery of the test body 6 around the central recess 15.

The outer end of coil 62 which extends over face 55 is connected to a connection area 64 provided on the fixed part 1 of the pendular structure by an electrical connection formed for example by a metallization on the other thin face of the flexible blade 4.

The inner end of coil 62 is connected to the inner end of coil 63 (situated on the other face 56), by a current passage 65 formed on the edge surrounding recess 15.

The outer end of coil 63 is connected to a connection area 66 provided on the fixed part 1 of the pendular structure, by an electrical connection formed for example by a metallization on the other thin face of the flexible blade 5.

It is clear that the connection areas 57, 60, 64, 66 correspond to the input/output terminals of the sensor, terminals 64, 66 serving for the return motor and terminals 57, 60 for energizing the capacitive detector.

Of course, the invention is not limited to the method of connection described above. Thus, for example, the test body could comprise only a single coil. Furthermore, the current passages from one face to the other of the test body could be formed, either by the edge, and/or by metallized holes.

It can be seen that, in the example shown in FIG. 8, the two thin faces of each flexible blade 4, 5 are metallized which, from the mechanical point of view, forms an appreciable advantage.

As mentioned above, for servo-controlling the above described accelerometer sensors, a motor is required for returning the test body for counterbalancing the external action. This return motor may use, in a way known per se, the Laplace force obtained by the action of a magnetic induction on a current flowing in at least one coil printed on one of the two faces of the test body.

One embodiment of such a return motor is shown schematically in FIGS. 9 and 10.

This return motor comprises two coils 62, 63 mounted respectively on the two faces of the test body 6 as in the case of FIG. 8. Each of these coils 62, 63 has a rectangular shape and comprises two lateral zones 70, 71, 72, 73 in which the turns are rectilinear and have a current flowing therethrough in opposite directions.

The magnetic circuit is formed of a permanent magnet 74, magnetized cross wise, two pole pieces 75, 76 associated with the magnet 74 and disposed on one side of the test body 6 at right angles to the two zones 70, 72 and 71, 73 of coils 62, 63 and a flux relooping armature 77 situated parallel to the other face of the test body.

The winding direction of the turns of the two coils 62, 63 is provided so that the Laplace forces generated by the magnetic induction B on zones 70, 72 and 71, 73 of coils 62, 63 are orientated in the same direction (in the plane of the test body) and are added to each other.

It will be noted that, so as not to overload the drawing in FIG. 9, only two coil turns have been shown for each face of the test body 6. Of course, in practice, the number of turns of these coils may be much higher.

The metal deposited on the pendular structure for forming the electric circuits (coils, capacative detectors, connections, etc. . . . ) may be gold or a gold alloy such as a chromium-gold alloy for example. However, according to an advantageous feature of the invention, these circuits are preferably made from silver or aluminium, which metals have more especially better electric conductivity and a smaller specific mass.

The above described accelerometer sensor may be housed in a case comprising a base and a cover. In this case, the assembly formed by the permanent magnet and the pole pieces may be integral with the base, whereas the flux relooping armature may be supported by the cover. Such an arrangement considerably simplifies the assembly of the sensor.

What is claimed is:

1. An accelerometer sensor comprising a flat pendular structure made from one and the same crystalline wafer, said structure having in a same plane, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to be able to move in translation in the same plane along a sensitive axis, ssid flat test body extending at least partially into said space, wherein said first end portions of the blades are located at a predetermined level and said test body extends in a zone located below said level, opposite to said second end portions of the blades.

2. An accelerometer sensor comprising a flat pendular structure made from one and the same crystalline wafer, said structure having in a same plane, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to be able to move in translation in the said plane along a sensitive axis, said flat test body extending at least partially into said space, wherein electric connections between the test body and the fixed part of the pendular structure are formed by metallizations formed on the thin faces of said flexible blades.

3. The accelerometer sensor as claimed in claim 2, wherein the center of gravity of the test body is situated in the space between said two flexible blades.

4. The accelerometer structure as claimed in claim 2, wherein said pendular structure is formed by micromachining from a crystalline wafer.

5. The accelerometer sensor as claimed in claim 2, wherein said test body comprises at least one central recess.

6. The sensor as claimed in claim 2, wherein said test body comprises two parallel faces, said sensor comprising at least one lateral capacitive detector with at least a first capacitor plate carried by one of said faces and at least a second capacitor plate parallel to the first plate and at a small distance therefrom, said second plate being carried by a frame integral with said fixed part of the pendular structure.

7. The sensor as claimed in claim 6, wherein said test body comprises at least a pair of conducting areas forming two capacitor plates which cooperate with a parallel conducting area on said frame.

8. The sensor as claimed in claim 7, wherein said test body comprises a plurality of pairs of conducting areas connected in parallel and forming two square shaped circuits having projections which are intermingled and said pairs of conducting areas each cooperate with a corresponding conducting area on said frame.

9. The sensor as claimed in claim 2, wherein said test body comprises two parallel faces, one of said faces having metallizations which form a flat coil forming part of a return motor used for servo-controlling the sensor.

10. The sensor as claimed in claim 2, wherein said test body comprises two parallel faces having metallizations which form two respective flat coils, said two coils being mounted in series and connected to each other by at least one conducting element passing from one face to the other of said test body.

11. The sensor as claimed in claim 10, wherein said conducting element consists of a metallized hole or a metallized zone on the edge of said test body.

12. The sensor as claimed in claim 2, wherein said test body comprises two parallel faces, said sensor comprising a return motor having at least one flat coil metallized on one of the faces of said test body, said coil comprising at least two opposite rectilinear zones perpendicular to the sensitive axis of the sensor and a magnetic circuit comprising a first part formed by a permanent magnet associated with two pole pieces disposed respectively at right angles to said rectilinear zones of said coil, on a first side of the test body, and a second part consisting of a flux return armature situated on a second side of said test body opposite to the first side.

13. The sensor as claimed in claim 10, wherein one of the two parts of said magnetic circuit is fixed to a base supporting the pendular structure, whereas the other part is integral with a cover which is fixable on said base.

14. An accelerometer sensor comprising a flat pendular structure made from one and the same crystalline wafer, said structure having in a same plate, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to be able to move in translation in the said plane along a sensitive axis, said flat test body extending at least partially into said space, wherein said flat fixed part comprises at least a first edge zone which carries a first metallization and said flat test body comprises at least a second edge zone which carries a second metallization facing the first metallization, said first and second metallizations forming a capacitor whose capacity varies depending on the position of said test body, electric connections between said second metallization and the fixed part of the pendular structure being formed by metallizations provided on the thin faces of said flexible blades.

15. An accelerometer sensor comprising a flat pendular structure made from one and the same crystalline wafer, said structure having in a same plane, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to be able to move in translation in the said plane along a sensitive axis, said flat test body extending at least partially into said space, wherein the test body comprises at least one lateral extension extending above said second end portions of the blades, said lateral extension comprising at least one rectilinear metallized edge perpendicular to the sensitive axis of the pendular structure and the fixed part of said pendular structure comprising at least one metallized rectilinear edge parallel to the metallized edge of said test body and forming therewith a flat capacitor whose capacity varies depending on the position of said test body.

16. The sensor as claimed in claim 15, wherein said lateral extension of the test body comes back towards one of said first end portions.

17. An accelorometer sensor comprising a flat pendular structure made from one and the same crystalline wafer, said structure having in a same plane, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to the able to move in translation in the said plane along a sensitive axis, said flat test body extending at least partially into said space, wherein said test body comprises first and second lateral edges, the first at least of these lateral edges bearing a first metallization and said fixed part of said pendular structure comprises at least one wing which extends between said first lateral edge and a corresponding flexible blade, said wing having an edge facing said first lateral edge and bearing a second metallization, said first and second metallizations forming therewith a flat capacitor whose capacity varies depending on the position of said test body.

18. An accelerometer sensor comprising a flat pendular structure made from one and the same crystalline wafer, said structure having in a same plane, a flat fixed part, two parallel blades flexible in the said plane and delimiting therebetween a space, each of said blades having a first end portion fixedly connected to said fixed part, and a second end portion, said structure further comprising a flat test body connected to the second end portions of said blades so as to be suspended from the fixed part and to be able to move in translation in the said plane along a sensitive axis, said flat test body extending at least partially into said space, wherein said test body comprises a first inner longitudinal edge which presents a crenelated shape having first square projections separated from each other by first square notches, and the fixed part of the pendular structure presents a crenelated shape having second square projections separated from each other by second square notches, said first square projections engaging in said second square notches and said second square projections engaging in said first square notches, said first square projections having first and second lateral edge portions bearing metallizations and said second square projections having third and fourth lateral edge portions bearing metallizations, the metallizations of said first lateral edge portions forming with the metallizations of said fourth lateral edge portions a first plurality of capacitors and the metallizations of said second lateral edge portions forming with the metallizations of said third lateral portions a second plurality of capacitors.

* * * * *